(12) United States Patent
Bailey et al.

(10) Patent No.: US 8,312,519 B1
(45) Date of Patent: Nov. 13, 2012

(54) AGILE OTP GENERATION

(76) Inventors: Daniel V Bailey, Pepperell, MA (US);
John G. Brainard, Sudbury, MA (US);
William M. Duane, Westford, MA (US);
Michael J. O'Malley, Lowell, MA (US);
Robert S. Phipott, Andover, MA (US)

( * ) Notice: Subject to any disclaimer, the term of this patent is extended or adjusted under 35 U.S.C. 154(b) by 261 days.

(21) Appl. No.: 12/895,130

(22) Filed: Sep. 30, 2010

(51) Int. Cl.
*G06F 7/04* (2006.01)
*H04L 9/00* (2006.01)

(52) U.S. Cl. ........... 726/6; 726/5; 726/7; 726/9; 726/10; 726/20; 713/184; 713/185; 713/156; 713/168; 380/255; 380/259; 380/262

(58) Field of Classification Search .................. 726/5–7, 726/9–10, 20; 713/156, 168, 184–185; 380/255, 380/259, 262
See application file for complete search history.

(56) References Cited

U.S. PATENT DOCUMENTS

| | | | | |
|---|---|---|---|---|
| 7,848,746 | B2 * | 12/2010 | Juels | 455/424 |
| 2007/0050635 | A1 * | 3/2007 | Popp | 713/185 |
| 2007/0250920 | A1 * | 10/2007 | Lindsay | 726/7 |
| 2009/0313687 | A1 * | 12/2009 | Popp et al. | 726/9 |
| 2010/0017860 | A1 * | 1/2010 | Ishida | 726/7 |
| 2010/0049975 | A1 * | 2/2010 | Parno et al. | 713/168 |
| 2010/0162377 | A1 * | 6/2010 | Gonzalez et al. | 726/9 |
| 2010/0180328 | A1 * | 7/2010 | Moas et al. | 726/6 |
| 2012/0079268 | A1 * | 3/2012 | Zhong et al. | 713/156 |

OTHER PUBLICATIONS

ByungRae Cha*, KyungJun Kim, HyunShik Na, "Random Password Generation of OTP System using Changed Location and Angle of Fingerprint Features" Honam Univ., Korea, Jul. 8-11, 2008, pp. 420-425.*

* cited by examiner

*Primary Examiner* — Taghi Arani
*Assistant Examiner* — Amir Mehrmanesh
(74) *Attorney, Agent, or Firm* — Krishnendu Gupta; Joseph D'Angelo

(57) ABSTRACT

A method, system, and apparatus for agile generation of one time passcodes (OTPs) in a security environment, the security environment having a token generator comprising a token generator algorithm and a validator, the method comprising generating a OTP at the token generator according to a variance technique; wherein the variance technique is selected from a set of variance techniques, receiving the OTP at a validator, determining, at the validator, the variance technique used by the token generator to generate the OTP, and determining whether to validate the OTP based on the OTP and variance technique.

12 Claims, 26 Drawing Sheets

TOKEN GENERATOR        1510

TokenAlgorithm1(X,Y,Z)   1512
TokenAlgorithm2(X,Y,Z)   1514
TokenAlgorithm3(X,Y,Z)   1516

FIG. 15

RECEIVE TOKEN CODE  1710

DETERMINE VARIANCE TECHNIQUE  1720

VALIDATE TOKEN CODE  1725

FIG. 17

RECEIVE TOKEN CODE   1910

DETERMINE VARIANCE
TECHNIQUE FROM
TOKEN FILE   1920

VALIDATE TOKEN CODE   1925

FIG. 19

RECEIVE TOKEN CODE    2110

DETERMINE VARIANCE TECHNIQUE FROM INFORMATION IN TOKEN    2120

VALIDATE TOKEN CODE    2125

FIG. 21

AGILE OTP GENERATION

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

RELATED APPLICATIONS

This application is related to co-pending U.S. patent application Ser. No. 12/827,045 entitled "DEVICE BOUND OTP GENERATION" and filed Jun. 30, 2010 and Ser. No. 11/824,434 issued as U.S. Pat. No. 8,060,750 entitled "SECURE SEED PROVISIONING" filed Jun. 29, 2007, the contents of which are hereby incorporated herein by reference in their entirety.

BACKGROUND OF THE INVENTION

Computer networks, and in particular Wide Area Networks (WANs) such as the Internet, provide opportunities for the misuse and abuse of communications traveling thereover. For example, two users (e.g., a human user and an enterprise server) communicating via the WAN may have their communications intercepted and/or altered. Also, it is possible for one user to misrepresent his, her, or its identity to another user.

Thus, there is a need for both privacy and authentication between users of the network communicating with one another. In other words, users should be able to rely on the fact that their transmissions will not be intercepted or altered, and that transmissions from someone purporting to be a particular user do in fact originate from that user.

In many secure communication applications, a seed is required in order to perform certain cryptographic operations such as encryption, decryption, authentication, etc. The seed may comprise, by way of example, a symmetric key or other secret shared by two or more entities.

One such application is in authentication tokens, such as the RSA SecurID® authentication token commercially available from RSA Security Inc. of Bedford, Mass., U.S.A. The RSA SecurID® authentication token is used to provide two-factor authentication. As used herein token generator and OTP generator may be used interchangeably. Authorized users are issued individually-registered tokens that generate one time passcodes (OTPs), which change based on a time code algorithm. OTPs may be used for various forms of authentication such as user, machine, transaction and message authentication. For example, a different OTP may be generated every 60 seconds. In a given two-factor authentication session, the user is required to enter a personal identification number (PIN) plus the current OTP from his or her authentication token. This information is supplied to an OTP validation entity. The OTP validation entity may be a server or other processing device equipped with RSA Authentication Manager® software, available from RSA Security Inc. The PIN and current OTP may be transmitted to the OTP validation entity via an encryption agent equipped with RSA Authentication Agent® software, also available from RSA Security Inc. If the PIN and current OTP are determined to be valid, the user is granted access appropriate to his or her authorization level. Thus, the OTPs are like temporary passwords that cannot be guessed by an attacker, with other than a negligible probability.

A given RSA SecurID® token typically contains one or more seeds that are utilized in computing the token outputs. The OTP validation entity performing the verification of the token outputs requires access to one or more seeds associated with the token in question. Typically, such authentication entities have access to the same seed or set of seeds that the token uses to generate its output.

SUMMARY OF THE INVENTION

A method, system, and apparatus for agile generation of one time passcodes (OTPs) in a security environment, the security environment having a OTP generator comprising a OTP generator algorithm and a validator, the method comprising generating a OTP at the OTP generator according to a variance technique; wherein the variance technique is selected from a set of variance techniques, receiving the OTP at a validator, determining, at the validator, the variance technique used by the OTP generator to generate the OTP, and determining whether to validate the OTP based on the OTP and variance technique.

BRIEF DESCRIPTION OF THE DRAWINGS

Features and advantages of the present disclosure will become more apparent from the following detailed description of exemplary embodiments thereof taken in conjunction with the accompanying drawings in which:

FIG. 15 illustrates an alternative embodiment of an OTP generator with three OTP algorithms;

FIG. 17 illustrates an embodiment of a method according to an aspect of the current disclosure;

FIG. 19 illustrates an embodiment of a method according to the instant disclosure.

FIG. 21 illustrates an alternative embodiment of a method according to the instant disclosure.

DETAILED DESCRIPTION

Figure 1:
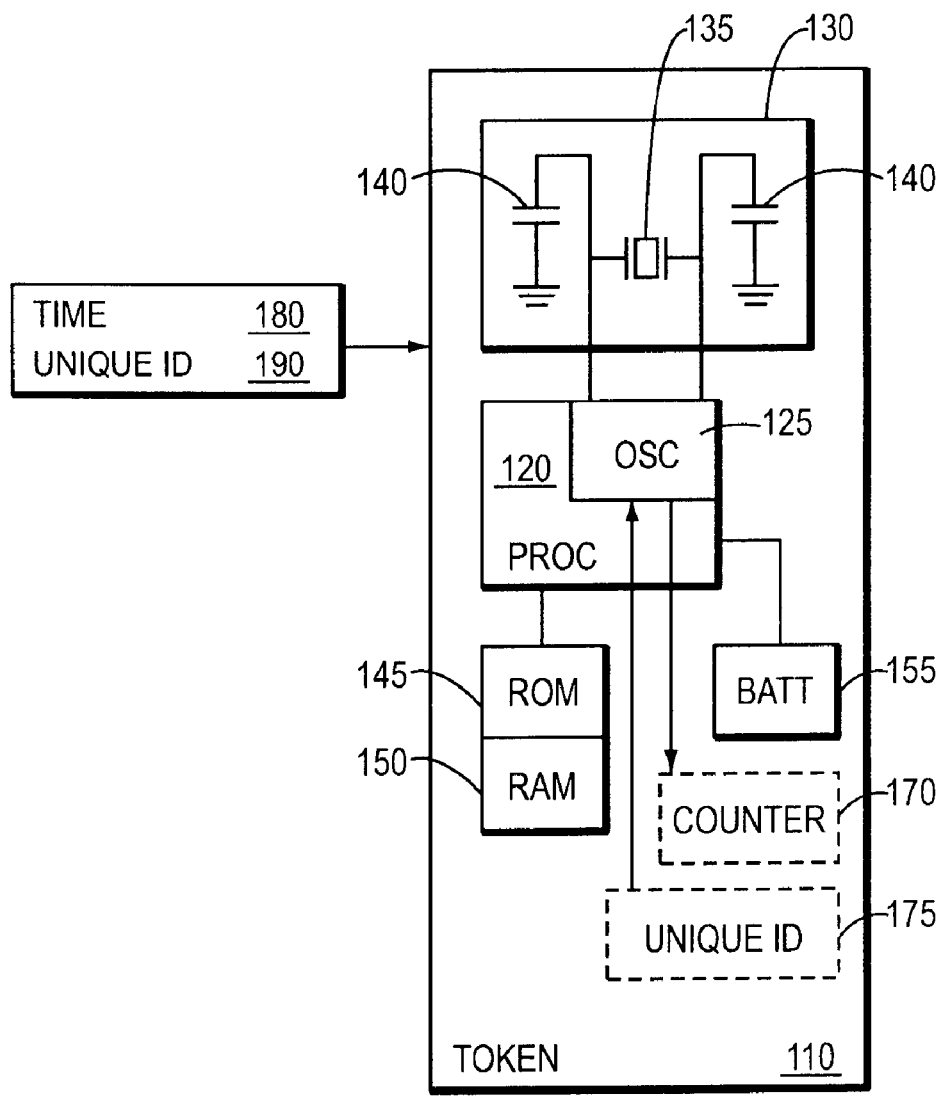
FIG. 1 is a block diagram of an example OTP generator.

An authentication token or OTP generator may be used to provide two-factor authentication where a user may be issued an individually-registered token, which generates single-use OTPs, which change based on a time code algorithm. For example, a different OTP may be generated every 60 seconds. The generation of the OTP may be driven by an internal clock of the OTP generator.

The OTP, in isolation or in combination with a user Personal Identification Number (PIN), may be supplied to an OTP validation entity. In some applications, the OTP in combination with different PINs may provide variance for the information transmitted to the authentication entity. Herein for simplicity, the OTP in isolation or in combination with the user PIN may be referred to as the OTP. The OTP validation entity may be a server or other processing device which may determine if the supplied information is valid, and may grant access appropriate to his or her authorization level.

The OTP validation entity may also have an internal clock to index the supplied token by a given time T. That is, the validator may compare a passcode the token generated to a passcode the validator generates at time T. In doing so, the validator may assume that the time T of the OTP is the same as the time T of the validator. In at least some embodiments, the time T may be used as an input to the function to generate the OTP. In certain embodiments, if different times are used to generate OTPs, the resulting OTPs generated may be different. As used herein, an OTP generator, or token may be used interchangeably to refer to what generates a passcode.

An OTP generator may be a software program resident on a hardware device, a hardware device, or a combination of software and hardware. Conventionally, an OTP generator includes a set of inputs, such as a key, an identifier for the particular key, and a value that changes monotonically (e.g., time, or a counter value). Both the OTP generator and the OTP validation entity must have access to this information to enable the validation of OTP values. Typically, OTP generators are provisioned or passed a key. Conventionally, the key in token products is often stored in a file on the host operating system or in memory on a hardware device. The information about characteristics of a token may be referred to herein as the token information file.

Conventionally, an OTP generator may need to be provisioned. Provisioning may be the process of initiating the token generation device with a time and a serial number or seed. In hardware, the provisioning process may be part of the manufacturing process. Typically, the key may be stored or available on the hardware and may be protected via some form of encryption. Conventionally, if the key is decrypted or obtained, it may be passed to the OTP generator to generate valid OTPs. Currently, this may make it easier to use a stolen key as the OTP generation may have no binding to the device for which it was intended. Typically, this may enable replication of the OTP if someone were able to gain access to the serial number, key, and OTP algorithm. Typically, the variance in a software or hardware token is limited. That is, a set of hardware and software tokens may use the same algorithm to generate OTPs and each algorithm may start with the same time, counter, and only vary by the starting seed or key.

Typically, another issue with a static algorithm implementation is that a side channel attack may be used to obtain details from the algorithm implementation. In an embodiment of the current disclosure, attacks on a token may be more difficult by increasing the data collection and management requirements for an attacker as these attacks focus on a single algorithm implementation. In certain embodiments, the attacks must be re-executed for each variation.

Variation Techniques

In an embodiment, the current techniques enable variance in tokens, which may increase the level of difficulty for an attacker to craft a single solution to attack a broad set of deployed tokens. In some embodiments of a token, this may include supporting multiple algorithm implementations or data combinations during the OTP generation. In further embodiments, the token may have certain characteristics (e.g., counter, a start time, etc.) and these characteristics may be randomized within manufacturing and the information recorded in the seed record. In alternative embodiments, the inputs to a token generation algorithm may represent functions instead of monotonic values.

In some embodiments, an OTP generator may generate token codes using an algorithm or function such as F(Counter, Key, . . . ), where F may refer to a cryptographic function or OTP algorithm and the function may take a counter, a key value, and some other parameters. In some embodiments, F may be fixed for the life of the OTP generator. In other embodiments, there may be a variance generator (VG), which may take a set of inputs VG(Input1, . . . ) which may be used to generate the function F and the set of inputs. In some embodiments, VG may output a function F' to be used by the OTP generator to generate token codes. In certain embodiments, VG may also create modified input variables for an OTP function such as Counter' and Key'. In further embodiments, F' and the inputs, which may or may not be modified, may be used to generate a token code. In certain embodiments, the function and inputs used to generate an OTP could be given by this equation: {F', set of inputs from VG}=VG(F, set of inputs). In some embodiments, the set of inputs from VG may be the same as the set of inputs used in VG. In other embodiments, the set of inputs may be different. In some embodiments, the F inputted into VG may be a set of functions.

In some embodiments, the variance function may be applied to any of the possible inputs to the OTP generating algorithm, to the selection of an OTP generating algorithm, for adapting a dynamic characteristic within the OTP generating algorithm, or to the outputs of the OTP generating algorithm. In other embodiments, the variance may result in a binding of the OTP value to a particular application or usage such that validation requests for alternate applications or usages will not be successful. In some embodiments, different algorithms may be used by the function generating a key. In alternative embodiments, different algorithms may be used to apply variance to the output of the OTP generator. In further embodiments, a variance may be applied at different points, other than the OTP generating algorithm.

In certain embodiments, an attacker may not have a known starting condition from which to mount an attack when analyzing multiple OTPs. In other embodiments, if the manner in which data is combined to form the OTP could be varied by utilizing these random settings in the token (or varying the padding as another example), then the method of attack may have to account for this variance, which complicates the attack by providing multiple branches or path to the generation of an OTP. In a further embodiment, these settings in combination with time variance may be used to choose the code paths in the token in a pseudo-random order further complicating the attack.

In an aspect of the current techniques, the OTP generated by an OTP generator may be varied in a controlled manner. This variance may allow the OTP generator to create OTPs which are less susceptible to attack. In certain embodiments, the validator may be aware of the variance but the techniques by which the validator predicts the variance may be a priori knowledge (e.g. a record provided at provisioning) or provided by the entity being authenticated, or provided in another manner. In some embodiments, different algorithms may be used by the OTP generator to generate the OTP.

In some embodiments, different algorithms may be used by the function generating a key. In other embodiments, different algorithms may be used to apply variance to the output of the OTP generator. In further embodiments, the variance may be applied at points other than the OTP generating algorithm.

In certain embodiments, an indication of algorithm or variance used by the OTP generator may be transmitted to the token validator. In some embodiments, the validator may be able to predict the variance. In some embodiments, the number of inputs to the OTP generator may be modified. In further embodiments, the inputs to the OTP generator may be modified or combined with other inputs. In alternative embodiments, an input to the token generation algorithm may be transformed by a function before being given to the OTP generator.

Provisioning Modification

Typically, when a token is provisioned, the token value is set to a fixed time and the serial number may be unique for that token. In some embodiments, a seed and time may be provided to the hardware token when it is made. Refer to the embodiment of FIG. 1. In this Figure, Token 110 is being provisioned with Time 180 and Unique ID 190. Conventionally, the initial time may be the same across the tokens.

In at least one embodiment of the current invention, the token may be configured with the time of manufacture as the start time. In further embodiments, this may include randomizing the defined start time for the token or some other value. This information regarding the variance may be recorded in the token information file which may be provided to the validator.

In some embodiments, a validator may load the token information file, which may contain information about the starting time for each token. Thus, when a token conveys information for authentication, the validator may have information about the token starting time and may be able to authenticate the token by recreating the token value using that particular token's starting time. In at least some embodiments, the varying of at least the starting time may make it harder for an attacker to determine the algorithm being used to generate the OTPs.

Figure 2A:
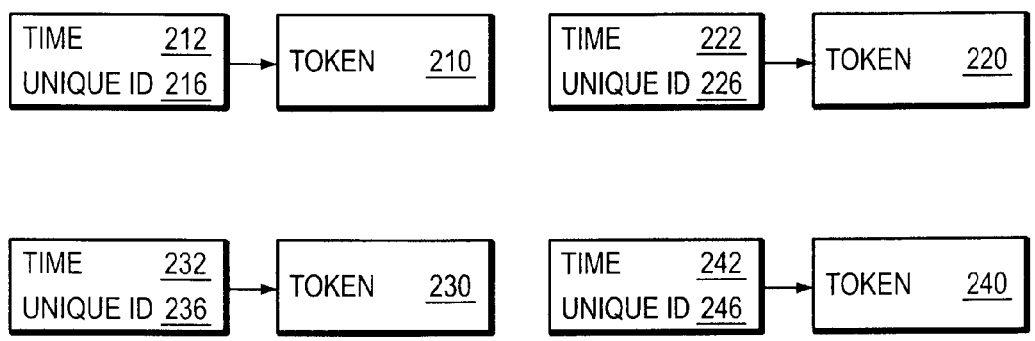
FIG. 2a illustrates an embodiment of OTP generator provisioning.
Figure 2B:
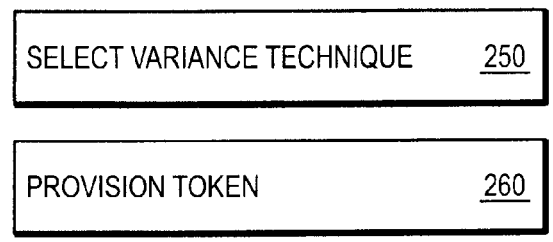
FIG. 2b illustrates a method according to an aspect of the current disclosure.

For example, refer to the embodiment of FIGS. 2a and 2b. In this embodiment, Tokens 210, 220, 230, and 240 are being provisioned. A variance technique is selected (step 25–). In this embodiment, each token is being provisioned with a different time, such as times 212, 222, 232, and 242, and a different Unique ID or seed (step 260).

Hardware Binding Code

In some embodiments, tokens may have unique hardware properties. In a further aspect of the current techniques, a key may be generated from a cryptographic operation over a user password, which may bind a password to a specific device. Herein, the term device ID may be used to refer to a unique identifier. The unique identifier may include, for example, a hardware ID, a communication session ID, an ID of a virtual device, and an ID of a virtual session.

In a particular embodiment of the current techniques, an OTP generator algorithm may use as an input a particular hardware code located on the hardware device on which the OTP generator algorithm resides. In at least some embodiments, the particular hardware code is a unique hardware code. In a further embodiment, this may enable an OTP generator to be tied to a particular piece of hardware such as a cell phone or a computer. In these embodiments, the hardware device code may have been previously communicated to the validator via a communication means. In certain embodiments, the communication of the device ID may be out of band with the transmission of the OTP.

In certain embodiments, the OTP validation entity may be made aware of the hardware specific device ID during the key provisioning process. In other embodiments, the OTP validation entity may be made aware of the hardware specific device ID in another manner, such as during out of band communication. In further embodiments, a system administrator may record the hardware specific device ID before giving the device to a user, where the system administrator may provide the validator with the device ID.

In other embodiments, a software token may be provisioned after the token program is installed on the device. In some embodiments, an administrator may Provision Token File with Device ID. A Validation Service may issue Token File Bound to Device ID. The token file may be returned to the administrator. The administrator may send the token file to the user. The user may obtain the token file and import the token file into the application.

Figure 3:
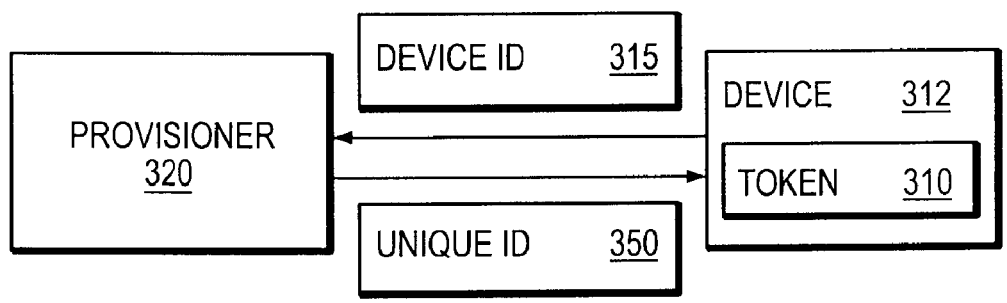
FIG. 3 illustrates an embodiment of OTP generator provisioning with a device ID.

For example, refer to the embodiment of FIG. 3. In this embodiment Token 310, resident on device 312, sends device ID 315 to Provisioner 320. Provisioner 320 returns a unique ID or seed which is bound to the device ID.

In a further embodiment of the current techniques, an OTP generator algorithm may use as an input a particular identifier provided by a virtual environment software running on a device on which the OTP generator algorithm resides. This identifier may represent a hardware identifier as passed between the device and the virtual environment, an identifier for the virtual environment, limiting the use of the key beyond the boundary of the virtual machine, or an identifier representing the availability of some other network system that must be present to provide an identifier for the algorithm.

Figure 4:
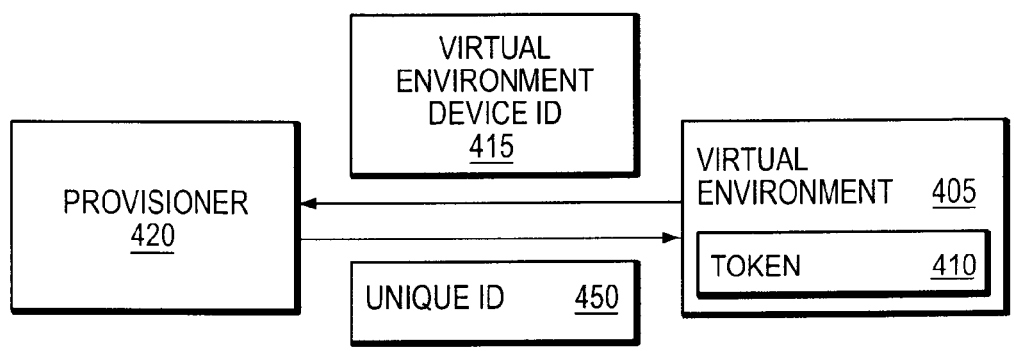
FIG. 4 illustrates an embodiment of OTP generator provisioning with a Virtual Environment ID.

For example, refer to the embodiment of FIG. 4. In this embodiment, the token 410 resides in a virtual environment 405. A device ID 415 is provided to Provisioner 420. Provisioner 420 provides a time and unique ID bound to the virtual device ID to the software token In a further embodiment of the current techniques, if the input characteristics and OTP algorithm were replicated on second hardware device, the OTP algorithm may not function correctly as the hardware identifier obtained corresponds to the second hardware device. In an embodiment of the current techniques, a hardware specific identifier may be used as an input to the OTP generation algorithm.

In alternative embodiments of the current techniques, the user may contact the administrator and provide the device specific ID, where the system administrator provides the ID to the OTP validator. In some embodiments, the user may contact the administrator by phone. In other embodiments, the user may contact the administrator by e-mail. In further embodiments, the device ID may be directly communicated to the authentication server during the provisioning process. In at least one embodiment, the device ID may be communicated via the availability of a network system or by an available network system.

Figure 5:
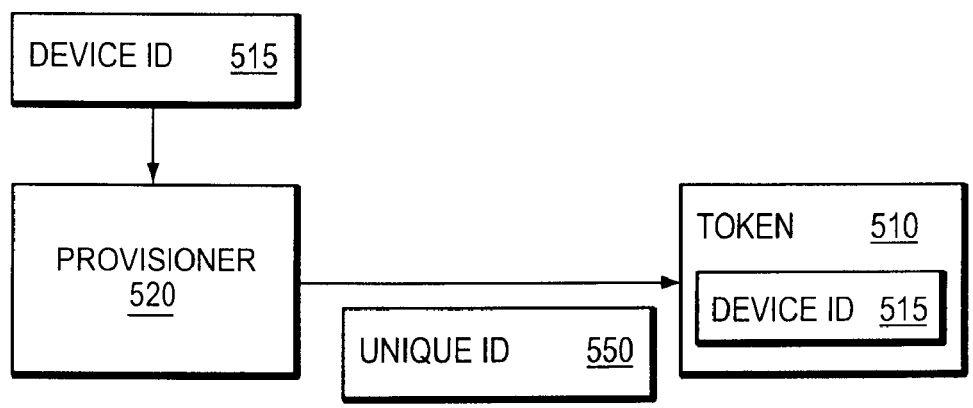
FIG. 5 illustrates an alternative embodiment of OTP generator provisioning.

For example, refer to the embodiment of FIG. 5. In this embodiment Token 510, resident on device 512, has a Device ID 515. Device ID 515 is sent to Provisioner 520 via an out of band communication. An out of band communication may mean that the Device ID 515 is not communicated via the same channel as the rest of the provisioning information. Provisioner 520 returns a unique ID 550 or seed which is bound to the device ID 515.

Figure 6:
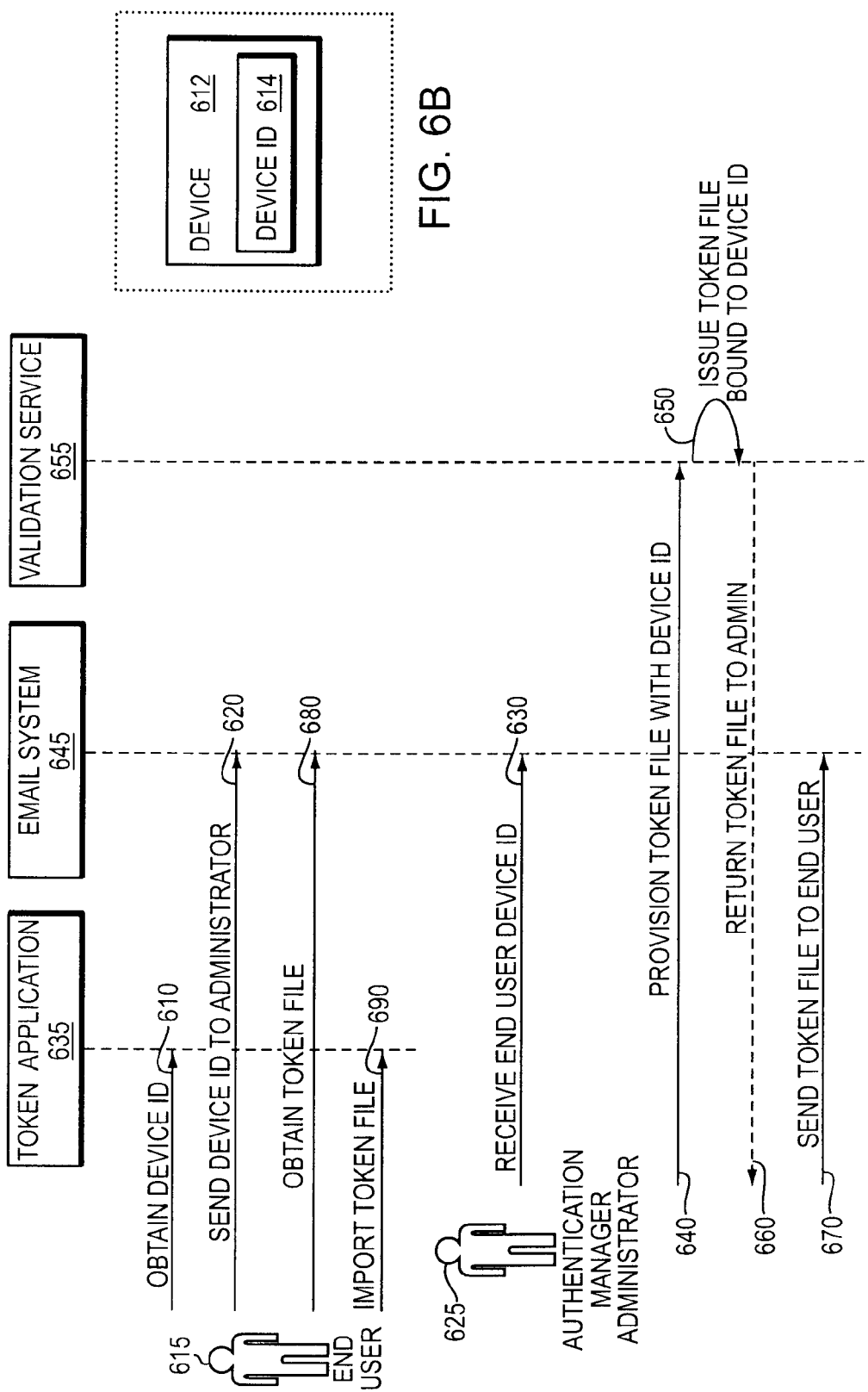
FIG. 6 illustrates an embodiment of OTP generator provisioning with a device ID.

Consider the embodiments of FIGS. 6a and 6b which represent token based file provisioning with device binding. In this embodiment, a user 615 may obtain a device ID 614 from a Device 612 (step 610). The end user 615 may send the device ID 614 to an Administrator 625 (step 620). The administrator 625 may receive the Device ID 614 from the end user 615 (step 630). The administrator 625 may provision a token file (step 640). The Validation Service 655 may issue a token file (step 650). The Validation Service 655 may return the token to the administrator 625 (step 660). The administrator 625 may send the token file to the user 615 (step 670). The user 615 may obtain the file (step 680). The user 615 may import the file (step 690). The user may then have a provisioned token application.

In a further embodiment of the current techniques, binding the OTP to a device may require a modification of the OTP generating algorithm to include a device ID in the calculation. In certain embodiments, as the device ID may be obtained directly from the device by the algorithm and may not be under the control of the attacker. In further embodiments, an attacker may be able to intercept a key passed to a token device during provisioning, but may have to capture the device to get the device ID or know the device ID in advance, in addition to the key to generate OTPs. In at least some embodiments, for an attacker to re-create an OTP, the attacker would also need to re-implement the OTP algorithm to generate codes on the intended device. In certain embodiments, by using a hardware specific characteristic, or a hash of a number of these characteristics, it may be able to create a device specific identifier. This may create an environment where only the device can generate the OTP.

In an embodiment of the current techniques, the inputs for an OTP generation function may be expressed as a set of inputs. In some embodiments the inputs may include a device ID which may be a unique hardware ID. When a device generates an OTP, it may include a monotonic value, key, key identifier, and device ID as inputs. In at least one embodiment, the use of the device ID creates a different OTP than if the device ID were not used. This adds a layer of complexity to the algorithm as an attacker with the other input values may not be able to re-create OTPs as the attacker does not have the device ID and may not know that it is to be used in the OTP generation. Or the attacker may not have source code for the algorithm implementation that would permit varying the device ID value.

Network Information Modification

In certain embodiments, the client device may use CT-KIP to identify hardware characteristics of the device. CT-KIP may be a client-server protocol for the secure initialization (and configuration) of cryptographic tokens. Conventionally, CT-KIP may require neither private-key capabilities in the cryptographic tokens, nor an established public-key infrastructure. Typically, successful execution of the CT-KIP may result in the generation of the same shared secret on both the server as well as the token. In further embodiments, the key may be provisioned using a different type of network-based provisioning protocol.

Figure 7:
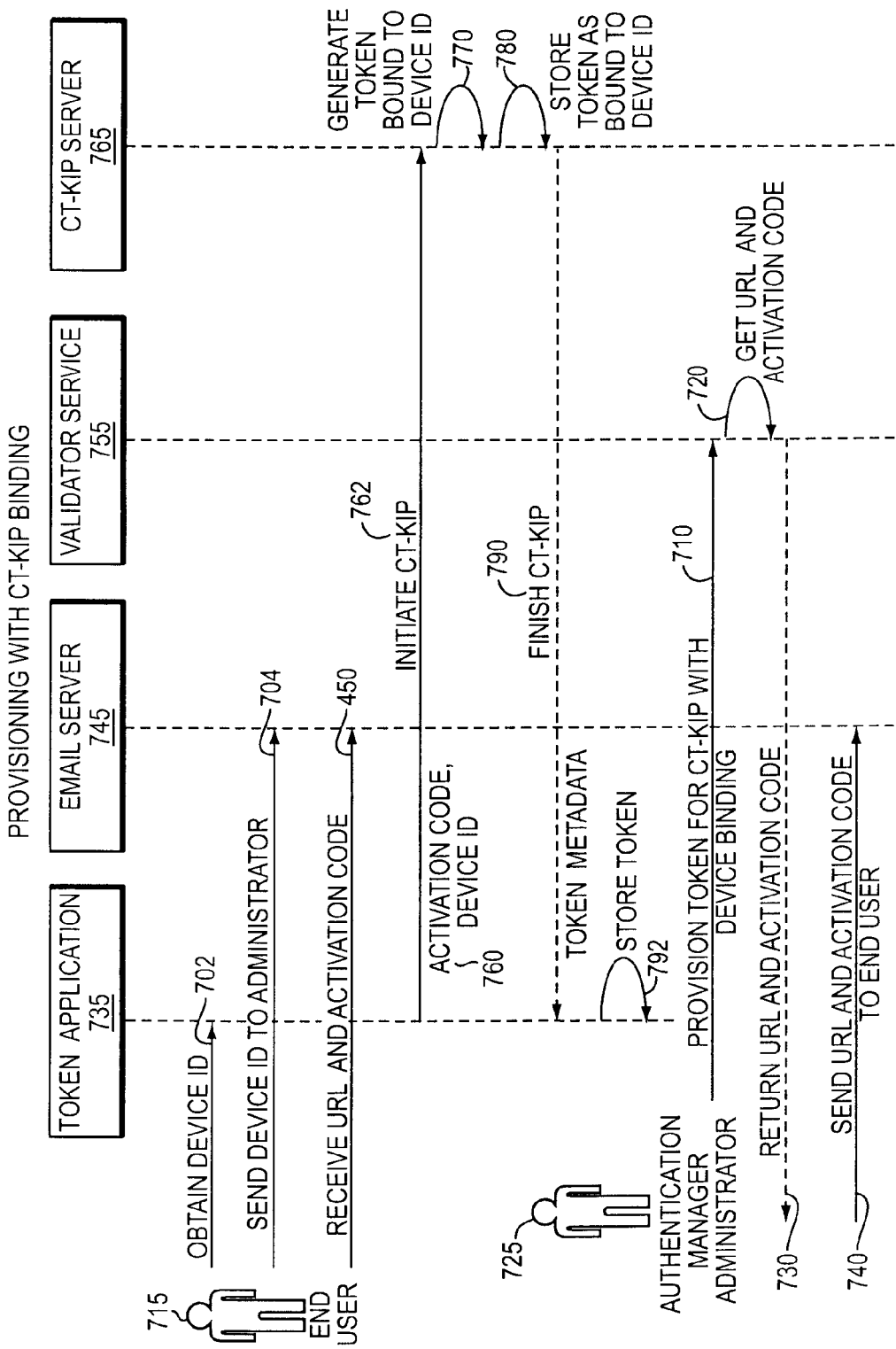
FIG. 7 illustrates an embodiment of OTP generator provisioning with CT-KIP.

Refer now to the embodiment of FIG. 7 illustrating provisioning of a software token via CT-KIP with binding. In this embodiment a user 715 obtains a device id from a device (step 702). A token application 735 may facilitate obtaining the device ID. The user 715 may send the device ID to an administrator 735 (step 704). The user may send the device ID to the administrator in a number of ways including using an e-mail server 745. The Administrator 725 may receive the device ID. The administrator 725 may provision a token for CT-KIP with device binding by communicating with the Validation Service 755 (step 710). The Validation Service 755 may get a URL and activation code of the CT-KIP server 765 (step 720). The Validation Service 755 may return the URL and activation code to the administrator 725 (step 730). The administrator 725 may send the URL and activation code to the user 715 via an e-mail server 745 (step 740). In alternative embodiments, the administrator 755 may communicate the URL and Activation code to the user in another method i.e. phone or personal contact. The user 715 may receive the URL and activation code (step 750). The User 715 may initiate CT-KIP using the activation code and device ID. The CT-KIP Server 765 may generate a token bound to the device ID (step 770). The CT-KIP 765 server may store the token as bound to the device ID (step 780). CT-KIP may finish and the token metadata may be returned to the application 735 (step 790). The application 735 may store the token (step 792).

In some embodiments of the current techniques, the addition of the hardware specific device ID may add a level of protection. In certain embodiments, the additional level of protection may be because the attacker does not possess the key, the algorithm, and/or the hardware specific ID needed to generate valid OTPs. In alternative embodiments, the OTP generating algorithm may include obtaining the device characteristics from the hardware. In further embodiments, this may require an attacker to re-implement the algorithm, gain the device ID, and gain the key in order to obtain the correct code. In even further embodiments, this may require the attacker to gain access to the device and query the device for the hardware specific characteristics.

Input Modification

In some embodiments of the current techniques, the inputs for a OTP generator may be modified. In at least one embodiment, the time input may be replaced with a time function. The result of the time function may be used to replace the time input for the OTP generator. The function may be any type of function, including but not limited to linear, sinusoidal, and exponential functions. In at least one embodiment, the validator may know of the time function. In certain embodiments, an indication of the time function may be stored in the token information file.

Figure 8:
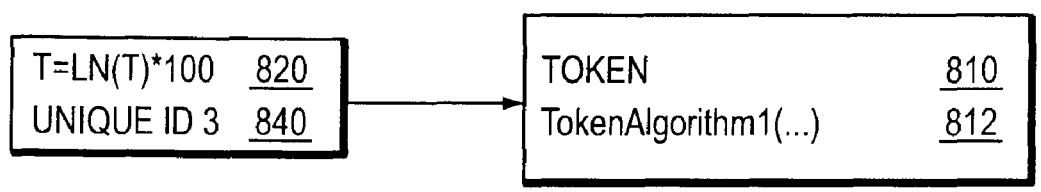
FIG. 8 illustrates an OTP generator.

For example, refer to the embodiment of FIG. 8. In this embodiment, token 810 is given as an input a function 820 that corresponds to a function of the time instead of the actual time. The token 810, when inputting the time value into the token algorithm 812, may enter the result of the function 820 as the time value.

In some embodiment, a counter may be added to the set of inputs. In another embodiment, the counter may be incremented in a non-linear manner. In a further embodiment, a hash of the counter may be used. In an alternative embodiment, the hash of the time may be used instead of the time. In alternative embodiments, the one or more of the inputs to the token generation algorithm may be subject to any number of manipulations. In at least some alternative embodiments, the validator may be able to predict the manipulation and authenticate based on the manipulation.

Figure 9:
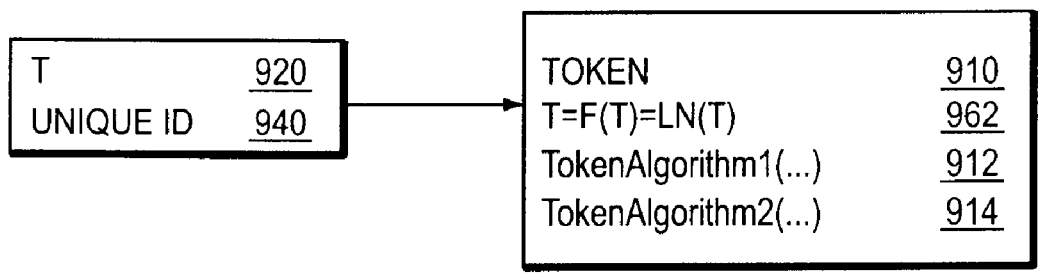
FIG. 9 illustrates an alternative embodiment of an OTP generator.

For example, refer to the embodiment of FIG. 9. In this embodiment, token 910 is given as an input a Time and Unique ID. The token 910, has a time function which it may take the current time and calculate a time value. It may then input that value into the token generation function 912 or token generation algorithm 914. Token 910 may switch between the token generation algorithms 912 and 914 according a random number generated in the token.

Figure 10:
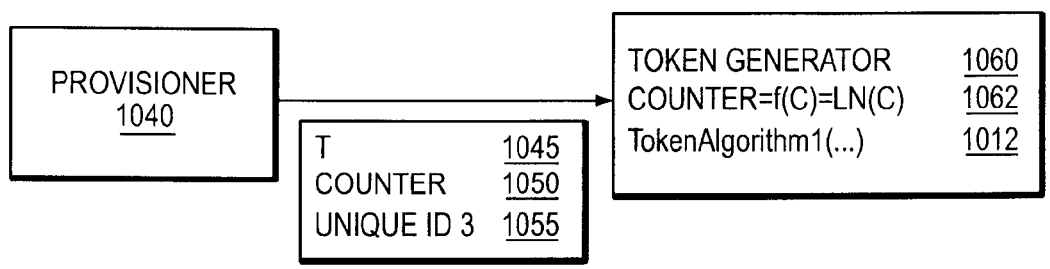
FIG. 10 illustrates an alternative embodiment of an OTP generator with a function instead of a counter value.

For example, refer to the embodiment of FIG. 10. In this embodiment, token 1060 has a function 1062 instead of the counter value. The token 1060, when inputting the counter value into the token algorithm 1012, may enter the result of the function 1062 as the counter value.

Additional Inputs

In an aspect of the current techniques, the function used to generate the OTP may be altered to include additional inputs. In an embodiment of the current techniques, an OTP generation algorithm used to generate the OTP may include any number of inputs.

In a further embodiment of the current techniques, the number and type of inputs for the OTP generation function may include information particular to the device on which the OTP generator is located. In an alternative embodiment the input may be a hash of the value. In further embodiments, the OTP generator may contact a web site. In some embodiments, information pertaining to the website e.g., the server IP address, the Common Name (CN) of the SSL certificate used, or the CN from the Root may be used in OTP generation.

Figure 11:
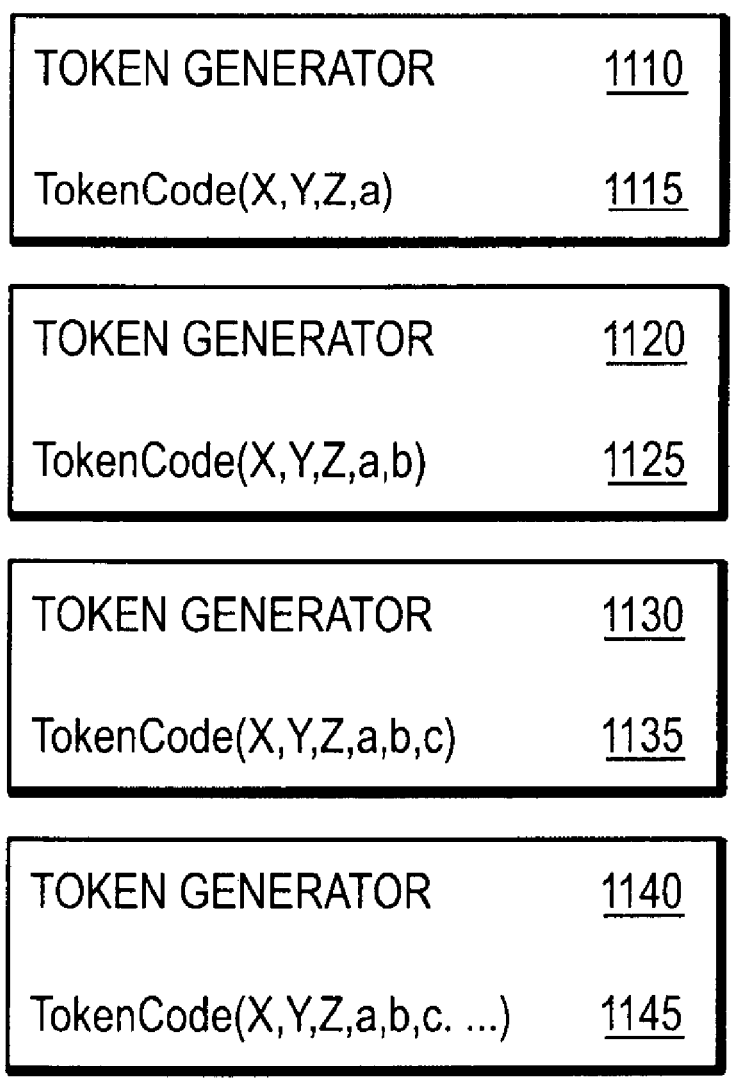
FIG. 11 illustrates an alternative embodiment of an OTP generators provisioned with different number and type of inputs for the OTP generation algorithms.

For example, refer to the embodiments of FIG. 11. In FIG. 11, OTP generators 1110, 1120, 1130, 1140, each have a different number and type of inputs for the OTP generation algorithms 1115, 1125, 1135, 1145, respectively.

Figure 12:
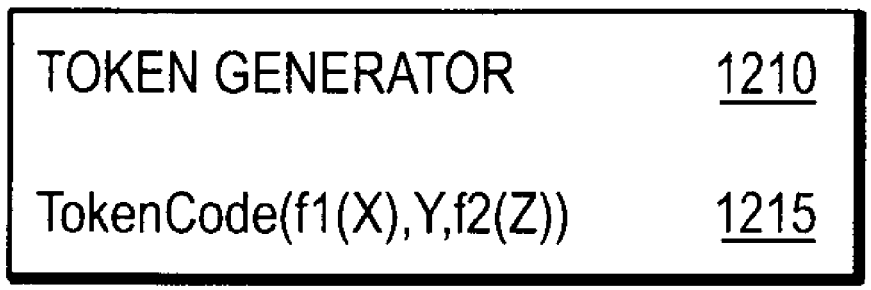
FIG. 12 illustrates an alternative embodiment of an OTP generator with function f1 and function f2 as inputs into the OTP generation algorithm.

Now refer to the embodiment of FIG. 12. In the embodiment of FIG. 12, the OTP generator 1210 has the result of function f1 and function f2 as inputs into the OTP generation algorithm 1215. In some embodiments, the seed may be a starting point from which the key is used in the OTP generation.

Figure 13:
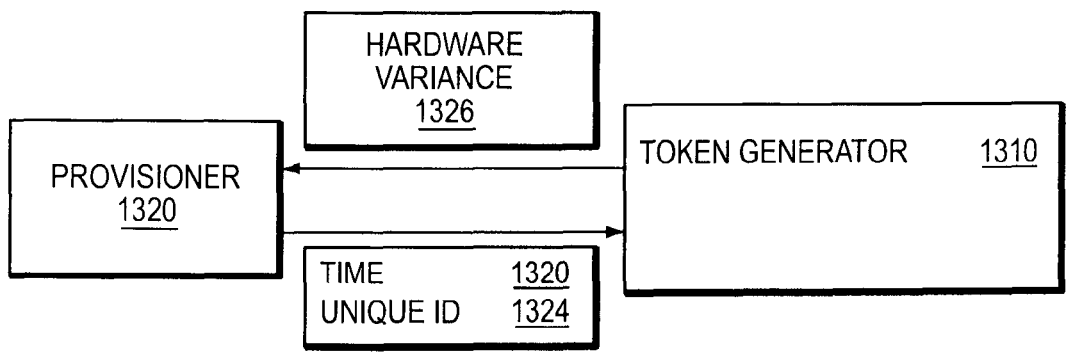
FIG. 13 illustrates an alternative embodiment of an OTP generator with hardware variance.

Now refer to the embodiment of FIG. 13. In this embodiment, the OTP generator 1310 has hardware varianace 1326. The hardware variance 1326 is communicated to Provisioner 1320. Provisioner 1320 binds the hardware variance to the unique id 1324 it sends to the OTP generator during the provisioning process.

Session ID

In an alternate embodiment of the current techniques the device ID is combined with a session specific ID for the server. In one such embodiment, the server identifier may be created from a cryptographic hash of the server's SSL certificate. The OTP validator may use the SSL certificate, or something derived from the SSL certificate that uniquely identifies the certificate, as an additional input to the generation algorithm. The resulting code may be passed to the webserver during normal authentication. The webserver may provide the certificate to the authentication server in order to validate the code. The authentication server may use the provided SSL certificate to derive a similar session identifier and along with the other inputs to the algorithm to verify the code supplied. The resulting authentication may verify that the user is in possession of a known device, and is communicating to a known server which possesses the keys necessary to complete a SSL network connection. In some embodiments, the verification case may include both the device ID and session ID, or any combination thereof.

Figure 14:
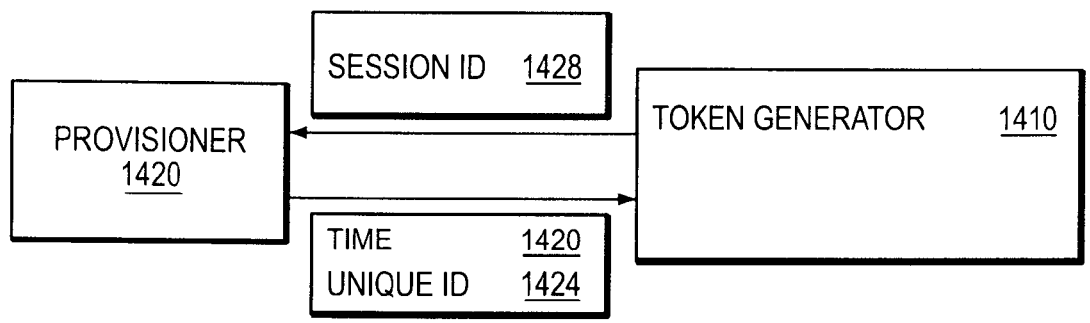
FIG. 14 illustrates an alternative embodiment of an OTP generator with a session ID associated with the OTP generator.

Refer now to the embodiment of FIG. 14. In this embodiment, a session ID associated with the OTP generator is sent to Provisioner 1420. Provisioner 1420 uses this session ID 1428 to bind the token information for OTP generator 1410 to this session id 1428.

Algorithm Modification

In some embodiments of the current techniques, an OTP generator may have access to multiple algorithms to generate OTPs. In certain embodiments, the OTP generator may use a different algorithm to generate an OTP based on a set of conditions. In at least one embodiment, the authenticating device may have access to the algorithms on the OTP generator. In further embodiments, the validator may have access to the conditions and may be able to predict which algorithm the token generator may use to generate a token. In some embodiments, the algorithm and switching function may be recorded in the token information file. In a further embodiment, the validator may not have knowledge of the algorithm switching mechanism. In this embodiment, the algorithm or variance used may be transmitted from the OTP generator to the validator. In some embodiments, the information about the algorithm or variance may be supplied via the supplied OTP to the validator and part of the OTP may contain an indicator of the algorithm used, or the validator may know it based on context, or based on the resource it is attempting to access.

In this embodiment, an attacker trying to break the algorithm used to generate the OTPs may have a harder time determining the algorithm as two algorithms are being used. Further, even if an attacker were to know that two algorithms were being used, the attacker may not know how to determine which algorithm is being used at which time. In further embodiments, any number of algorithms could be used and any number or type of functions may be used to switch between the algorithms.

Refer now to the embodiment of FIG. 15. In this embodiment Token Generator 1510 is able to use three token algorithms 1512, 1514, and 1516. Token Generator 1510 may select between these algorithms to generate a token. In some embodiments, a token generator may have a predetermined algorithm it uses to switch between the algorithms. In others embodiments, the token generator may tell the validator which algorithm it uses by encoding the algorithm choice into the OTP.

Agile Techniques

In some embodiments of the current disclosure, each token generator created may implement a different variance technique such as the aforementioned techniques. The variance technique for the token may be recorded in a seed file or token information file. In these embodiments, when the token generates an OTP and sends it to the validator, the validator, via the token information file, may account for the variance technique of the token generator. In certain embodiments, the OTP generator may use a variance generator (VG), which may take a set of inputs VG(Input1, . . . ) which may be used to generate the function F and the set of inputs. In some embodiments, VG may output a function F' to be used by the OTP generator to generate token codes. In certain embodiments, VG may also create modified input variables for an OTP function such as Counter' and Key'. In some embodiments, the token may employ one variance technique. In other embodiments, the token may employ a combination of variance techniques.

In further embodiments, the token generator may switch between variance techniques. In some embodiments, the token generator may inform the validator that it is switching between techniques. In other embodiments, the validator may be able to predict when a token generator switches between techniques. By varying the way the different token generators generate OTPs, an attacker may have a harder time being able to predict an OTP as observation of one token generator may not be used in predicting the OTPs generated by another OTP generator. As well, if one or more of the token generators switch algorithms while generating OTPs, this may additionally complicate any attack. Further, as the attacker may not know that the tokens are employing variance techniques, this may likely further complicate the attacks.

Figure 16:
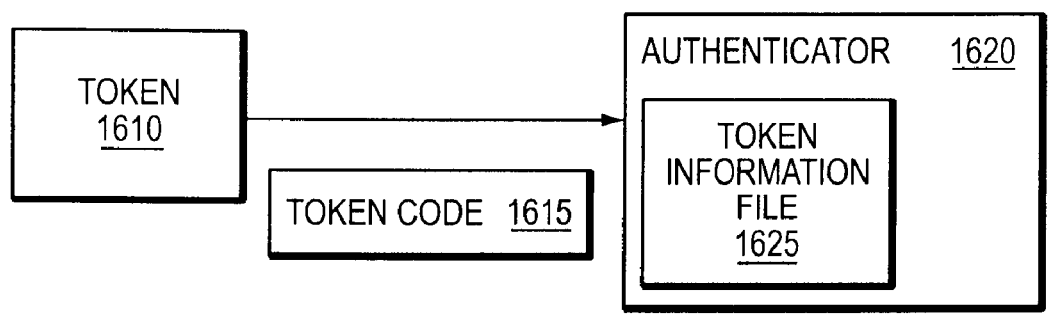
FIG. 16 illustrates an embodiment of a validator with a token information file.

For example, refer to the embodiments of FIGS. 16 and 17. In these embodiments, Token 1610 may send an OTP 1615 to validator 1620. Validator 1620 may receive the OTP 1615 (step 1710). The Validator 1620 may determine the variance technique (step 1720). The Validator 1620 may validate the OTP 1615 (step 1725).

In some embodiments, the token identifier and OTP may be sent to the validator as separate values. In some embodiments the token identifier and OTP may be sent together as a single value. Knowledge of the token identifier may enable the validator to determine which token is to be authenticated. Refer now to the embodiments of FIGS. 18 and 19. In these embodiments, Token 1810 may send OTP 1815 to Validator 1820. OTP 1815 may be represented by a binary number, where portion 1835 of the binary number may represent the token or token serial number. The Validator 1820 may receive the OTP 1815 (step 1910). The Validator may determine the type of variance of token 1810 by using the token information file 1825 (step 1920). In this embodiment, Token information file 1825 indicates that token 1010111010 corresponds to variance 1. Validator 1820 may validate the OTP 1815 (step 1925).

Figure 20:
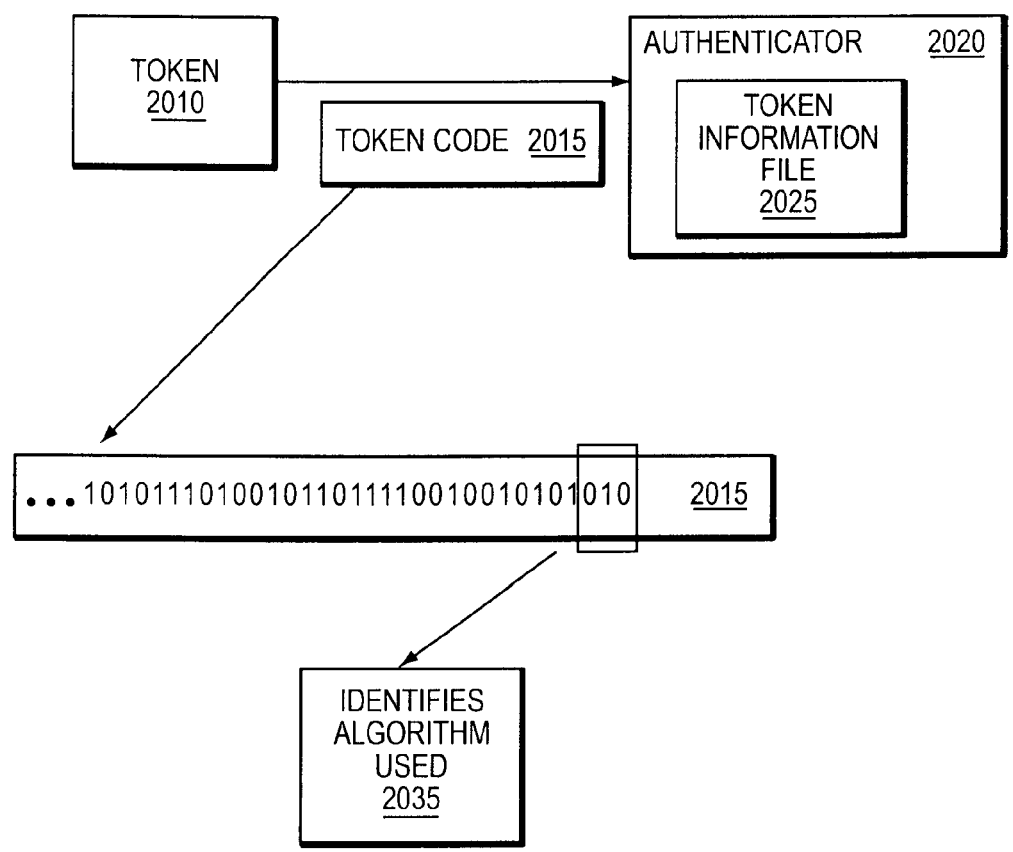
FIG. 20 illustrates an embodiment of a token code or OTP encoded with the algorithm used to generate the code.

Now refer to the embodiments of FIGS. 20 and 21. In these embodiments, Token 2010 may send OTP 2015 to Validator 2020. OTP 2015 may be represented by a binary number, where portion 2035 of the binary number may represent the algorithm or variance being used by token 2010. The Validator 2020 may receive the OTP 2015 (step 2110). The Validator 2020 may determine the type of variance of token 2010 using information in the OTP 2015 (step 2125). Validator 2020 may validate the OTP 2015 (step 2125).

In some embodiments, the token generator may always indicate the variance technique at a particular position in the OTP. In other embodiments, the token generator may vary the location of the portion of denoting the variance. In certain embodiments, where the variance position is not fixed, the validator may be able to predict what portion of the OTP corresponds to the portion dictating the variance used.

Figure 22:
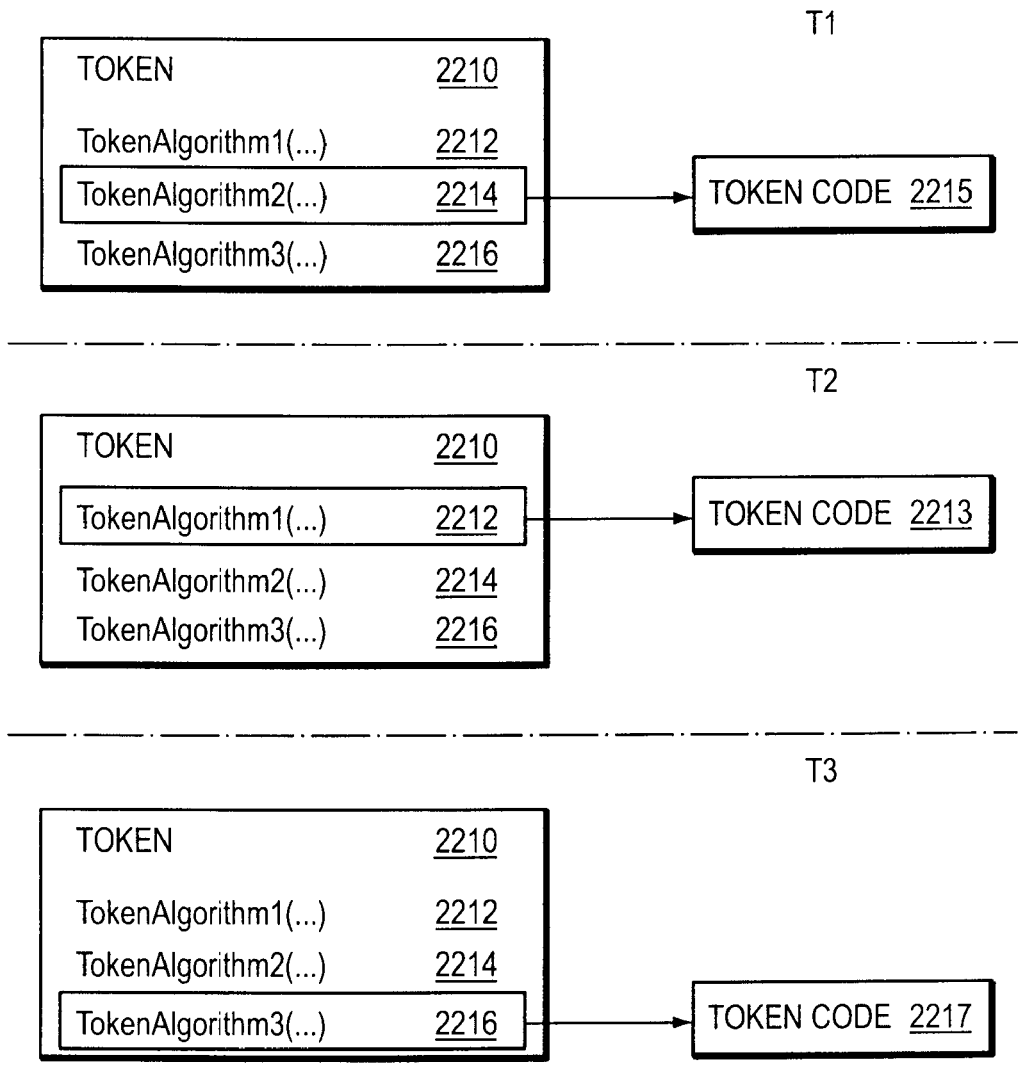
FIG. 22 illustrates an embodiment of OTP generators generating OTPs with different OTP algorithms.

Now refer to the embodiment of FIG. 22. In this embodiment token 2210 has 3 algorithms for generating OTPs, algorithms 2212, 2214, and 2216. At time T1, algorithm 2214 is used to generate OTP 2215. At time T2, token 2210 uses token algorithm 2212 to generate OTP 2213. At time T3, token 2210 uses token algorithm 2216 to generate OTP 2217. In some embodiments, the OTP may be sent to a validator which may be able to predict which algorithm the token used. In other embodiments, the token may encode the algorithm used into the OTP and the validator may be able to read which algorithm was used from the OTP.

Figure 23:
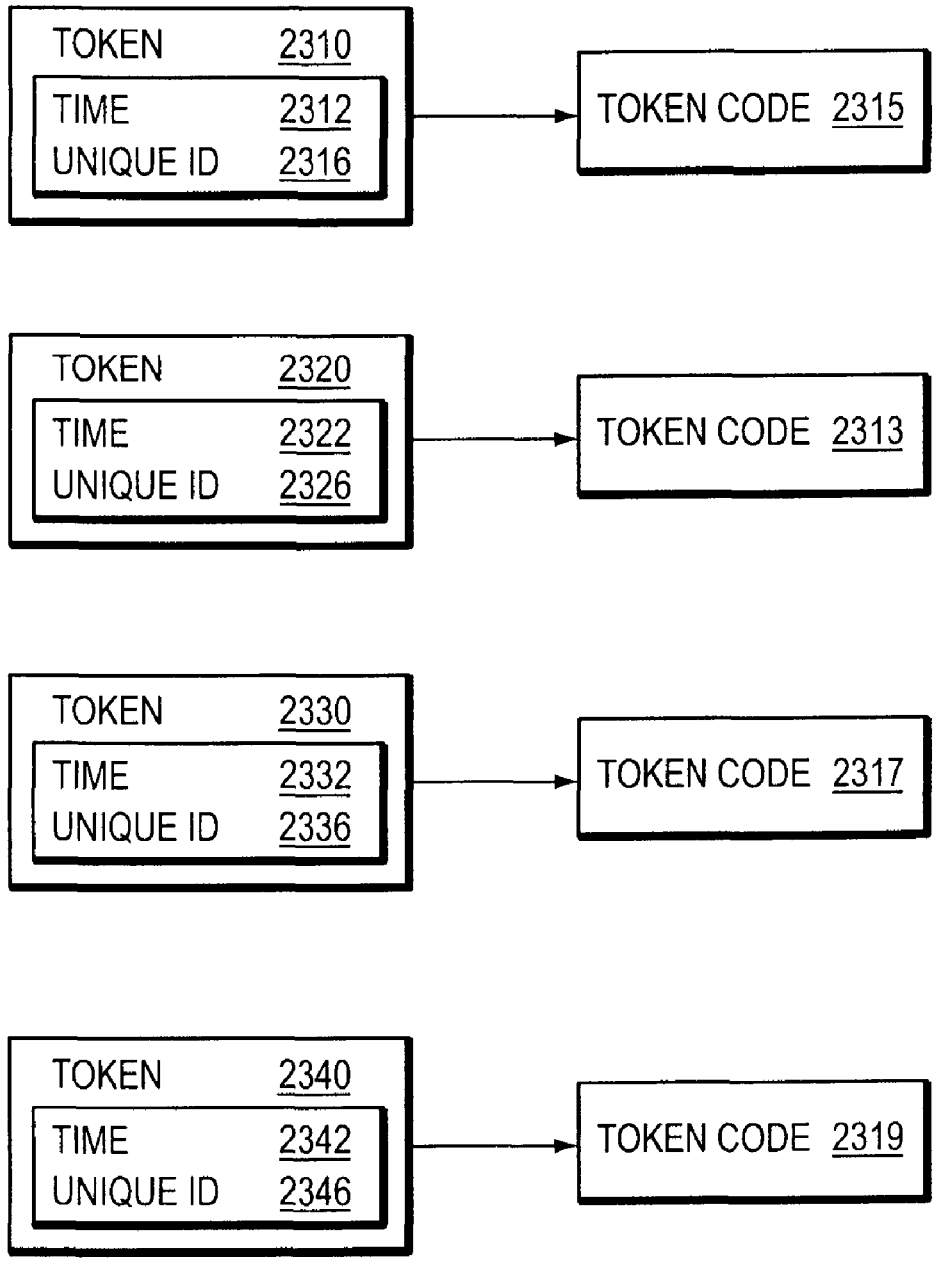
FIG. 23 illustrates an alternative embodiment of OTP generators set to a different starting time.

Refer now to the embodiment of FIG. 23. In this embodiment, the time of each token 2310, 2320, 2330 and 2340 is set to a different time. As each are set to a different time, if an attacker were to capture the OTPs generated by the tokens, the different settings would inject noise making it harder for the attacker to realize the algorithm and seeds for the tokens.

Figure 24:
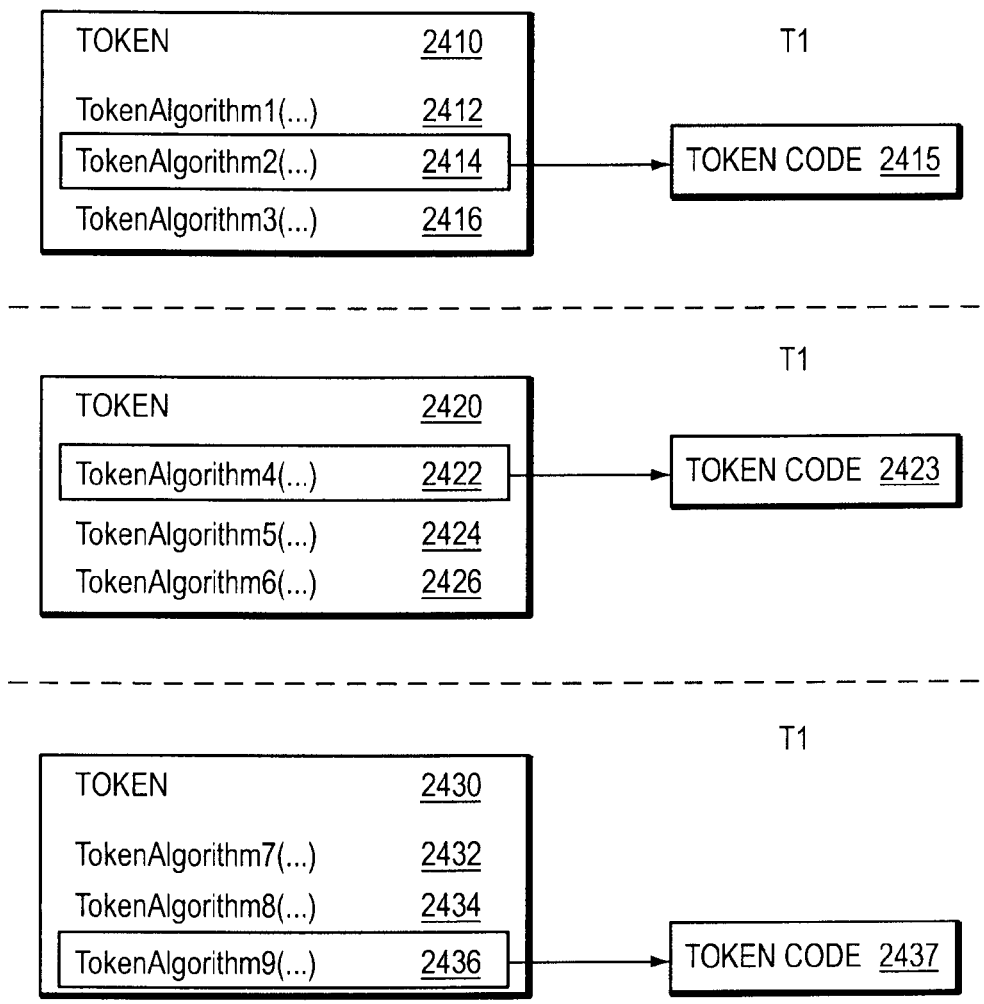
FIG. 24 illustrates an alternative embodiment of OTP generators generating OTPs with different OTP algorithms.
Figure 25:
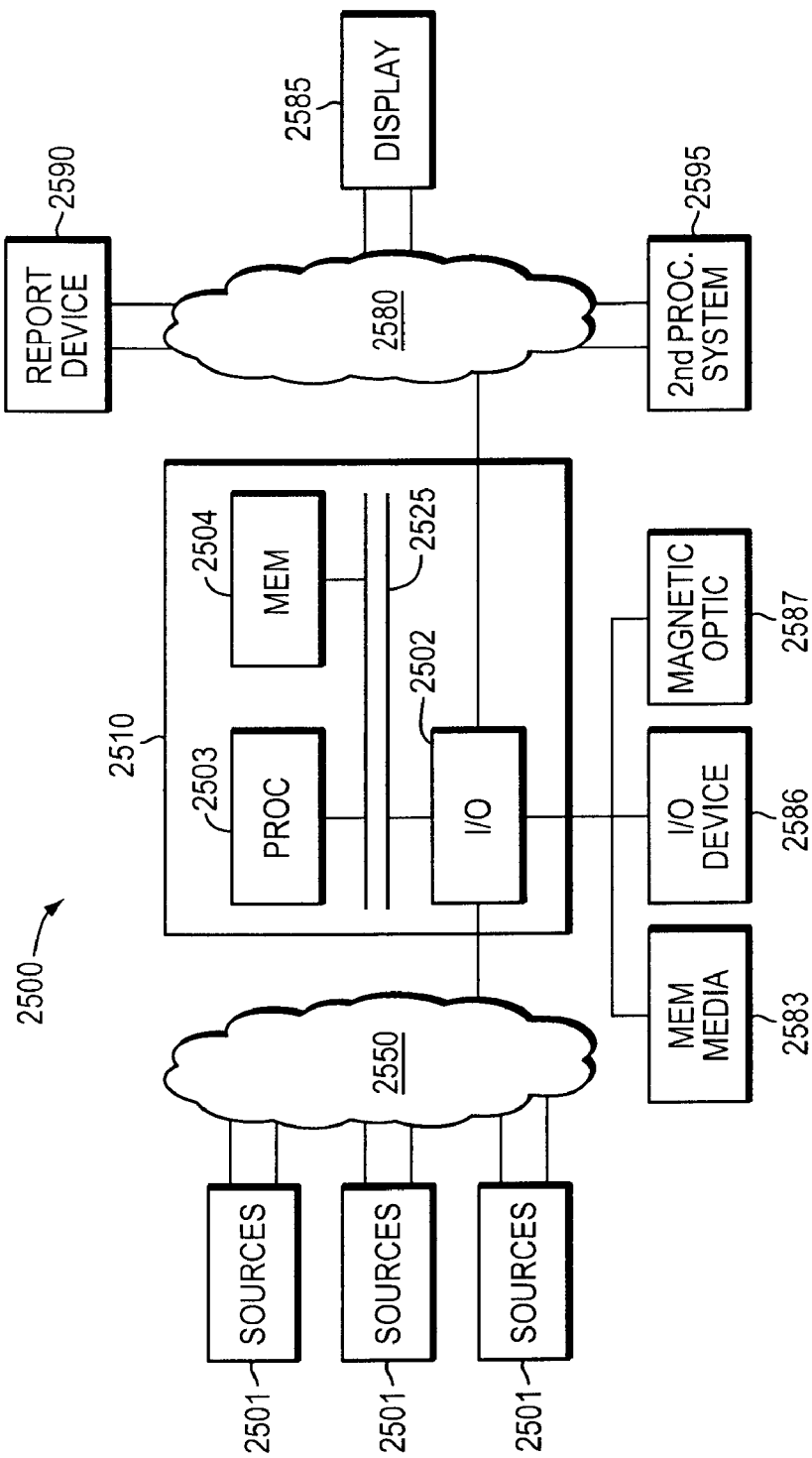
FIG. 25 is an example of an embodiment of an apparatus that may utilize the techniques described herein.
Figure 26:
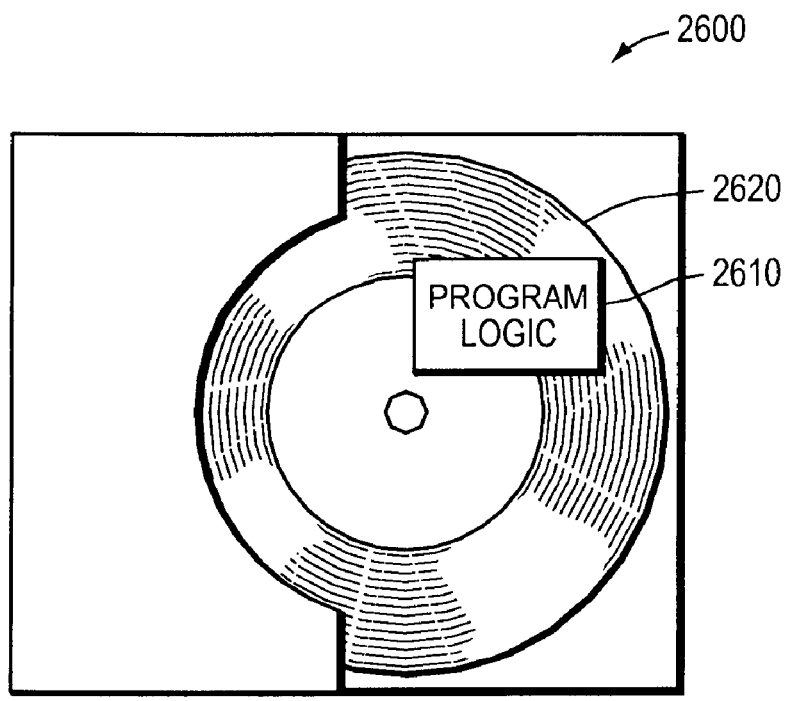
FIG. 26 is an example of an embodiment of a method embodied on a computer readable storage medium that may utilize the techniques described herein.

Refer now to the example embodiment of FIG. 24. In this embodiment there are three tokens 2410, 2420, and 2430. Each token has a set of algorithms that it can use to generate an OTP such as OTPs 2415, 2423, and 2437. Each OTP generator may also switch between the algorithms used to generate the OTPs. If an attacker were to observe these tokens, the attacker may have no knowledge that each token can switch between algorithms. This may make it harder for an attacker to predict future OTPs generated by the token.

OTP Use Policy

Typically, One-Time Password (OTP) tokens have implemented one algorithm for one purpose: user authentication. In an aspect of the instant disclosure, OTP generators may offer configurable options and multiple associated key types. In certain embodiments, an OTP validator may check that the OTP is being used properly (i.e. in a specified type of authentication).

In one embodiment, an OTP parameter like a key may be specified to be used to authenticate a user and an attacker may try to use the key for some other purpose such as to generate transaction signatures. In this embodiment, the validator should be able to detect and disallow this use. In an embodiment of the current disclosure, key usage may be specified. In another embodiment, key usage may be changed during the lifetime of the key, while allowing usage to be specified for a limited time.

In some embodiments, symmetric-key certificates may be defined and applied to OTP tokens. In certain embodiment, policy certificates, which bear some similarities in usage to public-key attribute certificates may be used. In further embodiments, a policy certificate may contain statements about how a key may used. In certain embodiments, these policies may change over the lifetime of the key.

In certain embodiments, a symmetric key may be a random string of bits. In some embodiments, a Certifying Authority (CA) may be appointed to make trusted statements about key ownership and usage. In other embodiments, a public-key certificate, such as one that follows the X.509 standard, may be created with structured statement with fields that specify details about a key. In certain embodiments, the following fields may be included:
  1. Serial Number: may uniquely identify the certificate.
  2. Subject: may be person or entity identified.
  3. Signature Algorithm: may be the algorithm used to create the signature.
  4. Issuer: may be the entity that verified the information and issued the certificate.
  5. Valid-From: may be the date the certificate is first valid from.
  6. Valid-To: may be the expiration date.
  7. Key-Usage: may be the purpose of the public key (e.g. encipherment, signature, certificate signing . . . ).
  8. Subject Public Key: may be the public key of a subject
  9. Thumbprint Algorithm: may be the algorithm used to hash the certificate.
  10. Thumbprint: may be the hash itself to ensure that the certificate has not been tampered with.

In some embodiments, the fields may be encoded using ASN.1. In other embodiments, a symmetric-key equivalent may be used. In some embodiments, a PKI certificate may use a digital signature algorithm and a symmetric-key certificate may use a Message Authentication Code (MAC). In further embodiments, the symmetric-key certificate and PKI certificate may take a message and a key and produce a short appendix that offers tamper resistance. Typically, symmetric keys and MACs may require that keys be kept secret in a symmetric system. Generally, anyone capable of verifying a certificate may be able to generate new certificates. Conventionally, if Subject Symmetric Key is included in the certificate, anyone able to read the certificate may thereafter pose as the subject itself.

In some embodiments according to an aspect of the current disclosure, Symmetric Key Certificates (SKCs) may not need to explicitly include the Subject Symmetric Key. In certain embodiments, there may be a field for Key Identifier. In this embodiment, instead of the explicit key value, there may be an opaque identifier like a key serial number or a cryptographic one-way function such as a hash. In further embodiments, the Key Identifier may be used in conjunction with a key database to retrieve the actual key value and determine that the SKC applies. In certain embodiments, the SKCs may not remain secret.

In some embodiments, to verify or compute an SKC, it may be necessary to access a symmetric key. In certain embodiments, the Issuer's symmetric key used to compute the MAC may not be the same as the Subject Symmetric Key. In other embodiments, by using a separate key to create SKCs, the compromise of any particular Subject Symmetric Key may not endow the attacker with the ability to create new SKCs.

In further embodiments, this system architecture for OTPs enables the verifier to validate tokencodes. In some embodiments, this technique may be applied to SKCs: although an SKC is not secret, only the verifier may check that the MAC value is correct. In certain embodiments, a token, server, or system user may inspect the SKC's fields to determine proper key usage. In alternative embodiments, a relying party may receive an assertion from the server that a received tokencode was valid and that its SKC is valid. In further embodiments, the relying party may determine based on the SKC value if the tokencode is valid for its intended usage.

In a particular embodiment, it may be specified in the SKC's Key Usage field that a particular Subject Symmetric Key is valid for OTPs and transaction signatures, but only for values up to $10,000. In some embodiments, statements like these may be encoded in any convenient format, such as XML, ASCII, or ASN.1.

An embodiment of a particular SKC definition is given below:
1. Serial Number: may be used to uniquely identify the certificate.
2. Subject: may be the person or entity identified.
3. Signature Algorithm: may be the algorithm used to create the signature (MAC).
4. Issuer: may be the entity that verified the information and issued the certificate.
5. Valid-From: may be the date the certificate is first valid from.
6. Valid-To: may be the expiration date.
7. Key-Usage-Algorithm(s): may denote which algorithm(s) for which this key may be used (e.g. OTP, transaction signature, certificate signing . . . ).
8. Key-Usage-Parameter(s): may be what if any parameters such as key-derivation function are to be used with this algorithm
9. Key-Usage-Application(s): may include other statements such as the highest financial value for which OTPs or signatures arising from the Subject Key may be relied upon
10. Subject Key Identifier: may be an opaque value such as a database index or hash that uniquely identifies the key without revealing it
11. Signature: may be the MAC of the certificate In a still further embodiment, the SKC may be used to create an OTP. A traditional OTP may be defined as the hash of a counter and a key. In further embodiments, to ensure that a particular OTP is only used for a valid purpose, part of the SKC may be used in the OTP calculation. In certain embodiments, an OTP may be defined as H(SKC, Counter, Subject Symmetric Key). Where H is a function to generate an OTP and a SKC is a symmetric key certificate.

In some embodiments, as the Issuer or verifier can compute the Signature on an SKC, the token may not produce a bogus SKC. In certain embodiments, the verifier may check that a tokencode is being used properly. In alternative embodiments, the OTP calculation may include not the entire SKC, but only the Signature block itself.

In at least one embodiment, an SKC includes date fields Valid-From and Valid-To. In other embodiments, these fields may correspond to the lifetime of a key. In some embodiments, this may result in limited lifetimes for keys. In further embodiments, this may include changing a key's usage policy multiple times during its lifetime.

In some embodiments, a key may be provisioned for a number of years and have a lifetime to match. In other embodiments, its usage for a particular algorithm, parameter set, or application may be far more limited.

In one embodiment, a key may be provisioned for five years for OTP applications. In this embodiment, it may useful to allow it for use for transaction signing. In this embodiment, rather than entirely re-provision the token, by sending a new Symmetric-key Policy Certificate (SKPC), the new application may be selectively allowed to operate. In this embodiment, the SKC may include appropriate identifiers for the OTP application (and any parameters). In some embodiments, the SKPC may include the identifiers for the transaction signing application.

In certain embodiments, an SKPC may a reduced subset of an SKC, as exemplified by the following embodiment.
1. Serial Number: may be used to uniquely identify the certificate.
2. SKC Serial Number: may be the Serial Number of the SKC
3. Signature Algorithm (optional): may be the algorithm used to create the signature (MAC), if different from that in the SKC.
4. Issuer (optional): may be entity that verified the information and issued the certificate.
5. Valid-From: may be the date the certificate is first valid from.
6. Valid-To: may be the expiration date.
7. Key-Usage-Algorithm(s): may be which algorithm(s) for which the key can be used (e.g. OTP, transaction signature, certificate signing . . . ).
8. Key-Usage-Parameter(s): may be any parameters such as key-derivation function are to be used with this algorithm
9. Key-Usage-Application(s): may include other statements such as the highest financial value for which OTPs or signatures arising from the Subject Key may be relied upon
10. Signature: may be the MAC of the certificate In some embodiments, the certificates may be used to generate a single OTP: H(SKC, SKPC, Counter, Subject Symmetric Key). In these embodiments, the SKC and SKPC may be combined using concatenation. In other embodiments, the SKC and SKPC may be combined in other ways, such as by applying a function such as XOR, which may result in an OTP: H(f(SKC, SKPC), Counter, Subject Symmetric Key). In further embodiments, the SKPC signature may be used in place of the SKC as an optimization.

In further embodiments, the OTP generator may access or include local or environmental variables to generate the OTP. In some embodiments, the environmental variables may include a cell tower, other wireless devices, or geographic location. In other embodiments, the environmental variable may be a network identifier or other identifier. In some embodiments, a Beacon or other marker in a Virtual Machine could be included as an input in the OTP generator. In other embodiments, a specific range could be included in the OTP generation. In certain embodiments, additional inputs may be included in the OTP generation provided that these inputs be conveyed, calculated, or known a priori by the OTP validator.

One or more tokens, OTP validators, and validators may be included in, or include, by way of example and without limitation, a computer, a mobile telephone, a personal digital assistant (PDA), a smart card, an authentication token, a server, and/or various portions or combinations of these and other processing devices. One or more of tokens and validators may thus be implemented as otherwise conventional processing devices programmed by software and/or firmware to perform portions of the technique as described herein. Conventional aspects of such equipment are well known to those skilled in the art, and are therefore not described in detail herein.

In an example implementation, the token comprises or is otherwise associated with an authentication token, such as an RSA SecurID® authentication token. However, the technique is adaptable in a straightforward manner to a wide variety of other cryptographic processing devices.

A token may communicate with a validator directly over respective links, or may communicate via one or more intermediary processing devices. For example, if the token comprises an authentication token, it may communicate with a validator over an internet link or using an intermediary device such as a desktop or portable personal computer, mobile telephone or PDA to allow user entry of the OTP. A token may be viewed as comprising, for example, a combination of an authentication token and an associated computer or other intermediary device physical or virtual. As indicated above, the term "processing device" as used herein is intended to encompass such combinations of devices.

Details regarding certain conventional cryptographic techniques suitable for use in conjunction with the present invention may be found in, e.g., A. J. Menezes et al., Handbook of Applied Cryptography, CRC Press, 1997, which is incorporated by reference herein.

It should again be emphasized that the embodiments described above are provided by way of illustration, and should not be construed as limiting the present invention to any specific embodiment or group of embodiments. For example, the invention can be implemented in other types of systems, using different arrangements of processing devices and processing operations. Also, message formats and communication protocols utilized may be varied in alternative embodiments. Moreover, various simplifying assumptions made above in the course of describing the illustrative embodiments should also be viewed as exemplary rather than as requirements or limitations of the invention. Numerous alternative embodiments within the scope of the appended claims will be readily apparent to those skilled in the art.

The methods and apparatus of this invention may take the form, at least partially, of program code (i.e., instructions) embodied in tangible media, such as floppy diskettes, CD-ROMs, hard drives, random access or read only-memory, or any other machine-readable storage medium. When the program code is loaded into and executed by a machine, such as the computer of FIG. 22, the machine becomes an apparatus for practicing the invention. When implemented on one or more general-purpose processors, the program code combines with such a processor to provide a unique apparatus that operates analogously to specific logic circuits. As such a general purpose digital machine can be transformed into a special purpose digital machine. FIG. 23 shows Program Logic 230 embodied on a computer-readable medium 2330 as shown, and wherein the Logic is encoded in computer-executable code configured for carrying out the reservation service process of this invention and thereby forming a Computer Program Product 2300.

Figure 18:
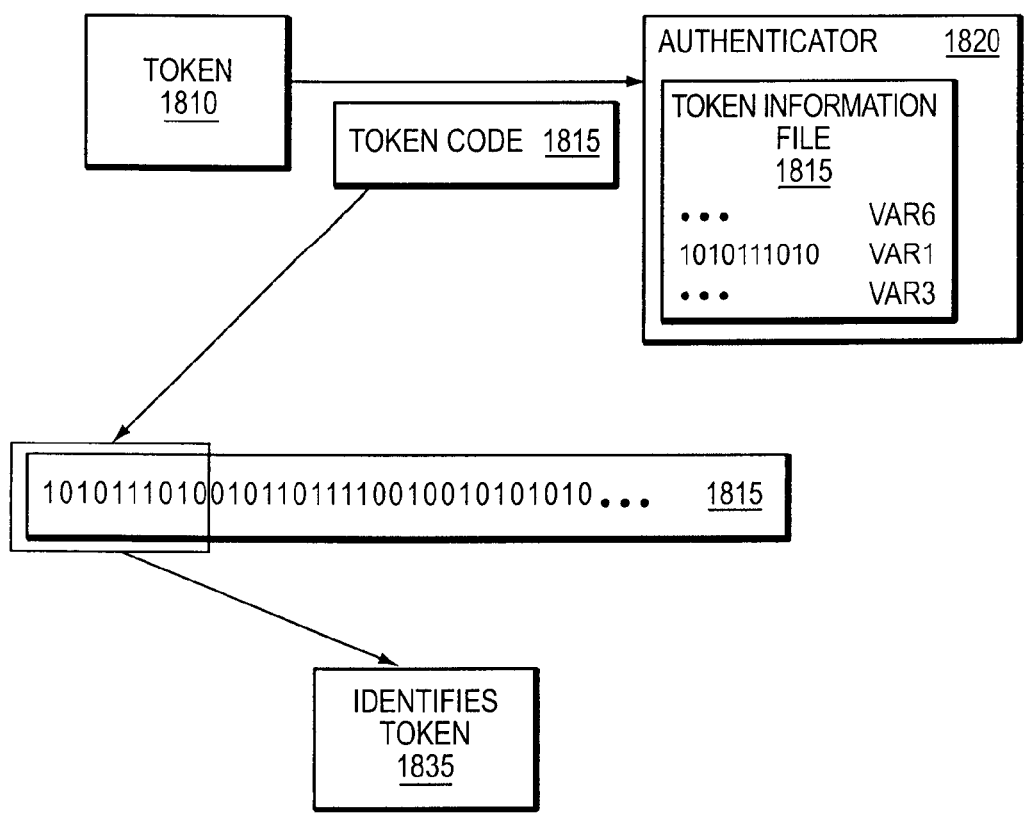
FIG. 18 illustrates an embodiment of an OTP with information encoded in the OTP.

The logic for carrying out the method may be embodied as part of the aforementioned system, which is useful for carrying out a method described with reference to embodiments shown in, for example, FIG. 18 and FIG. 19. For purposes of illustrating the present invention, the invention is described as embodied in a specific configuration and using special logical arrangements, but one skilled in the art will appreciate that the device is not limited to the specific configuration but rather only by the claims included with this specification.

What is claimed is:

1. A method for agile generation of one time passcodes (OTPs) in a security environment, the security environment having a validator and a token generator comprising a token generator algorithm, the method comprising:
    generating a client OTP at the token generator according to a variance technique; wherein the variance technique is selected from a set of variance techniques;
    receiving the client OTP at a validator, wherein the validator is different from the token generator;
    determining, at the validator, the variance technique used by the token generator to generate the client OTP;
    determining whether to validate the client OTP based on the client OTP and variance technique;
    validating the client OTP based on the determination; and
    where the variance technique is given by a function OTP=H(F(SKC, SKPC),InputSet), wherein H is a Hash and wherein the InputSet is a set comprising K and Time, wherein Time is the time for the OTP; wherein K is a key, SKC is a Symmetric Key certificate containing information about the key, F is a function or algorithm which switches among a plurality of OTP generation algorithms for each OTP generation, SKPC is a Symmetric Key Policy Certificate containing policy information about the key.

2. The method of claim 1 wherein the validator determines the variance technique of the set of variance techniques by using an information file containing information about the token.

3. The method of claim 2 wherein the information file is a certificate.

4. The method of claim 1 wherein information about one of the variance techniques of the set of variance techniques is encoded in the OTP.

5. The method of claim 1 wherein the variance technique is obtained from the environment of the OTP generator.

6. The method of claim 1 wherein the variance technique is obtained from variances within the OTP generator.

7. A system for agile generation of one time passcodes (OTPs) in a security environment, the system comprising:
- a token generator comprising a token generator algorithm; wherein the token generator algorithm generates a client OTP at the token generator according to a variance technique; wherein the variance technique is selected from a set of variance techniques;
- a validator comprising a processor configured to execute computer-executable program code stored in memory, wherein the computer-executable program code upon execution is configured to enable execution of:
- receiving the client OTP at a validator wherein the validator is different from the token generator;
- determining, at the validator, the variance technique used by the token generator to generate the OTP; and
- determining whether to validate the client OTP based on the client OTP and variance technique;
- validating the client OTP based on the determination; and
- where the variance technique is given by a function OTP=H(F(SKC, SKPC),InputSet), wherein H is a Hash and wherein the InputSet is a set comprising K and Time, wherein Time is the time for the OTP; wherein K is a key, SKC is a Symmetric Key certificate containing information about the key, F is a function or algorithm which switches among a plurality of OTP generation algorithms for each OTP generation, SKPC is a Symmetric Key Policy Certificate containing policy information about the key.

8. The system of claim 7 wherein the validator determines the variance technique of the set of variance techniques by using an information file containing information about the token generator.

9. The system of claim 7 wherein information about one of the variance techniques of the set of variance techniques is encoded in the OTP.

10. The system of claim 7 wherein the variance technique is obtained from the environment of the OTP generator.

11. The system of claim 7 wherein the variance technique is obtained from variances within the OTP generator.

12. The system of claim 7 wherein the information file is a certificate.

* * * * *

UNITED STATES PATENT AND TRADEMARK OFFICE
CERTIFICATE OF CORRECTION

PATENT NO. : 8,312,519 B1
APPLICATION NO. : 12/895130
DATED : November 13, 2012
INVENTOR(S) : Daniel V. Bailey et al.

Page 1 of 1

It is certified that error appears in the above-identified patent and that said Letters Patent is hereby corrected as shown below:

Title Page, Item (75)

INVENTORS:
Daniel V. Bailey, Pepperell, MA (US);
John G. Brainard, Sudbury, MA (US);
William M. Duane, Westford, MA (US);
Michael J. O'Malley, Lowell, MA (US);
Robert S. Phipott, Andover, MA (US)

SHOULD READ
INVENTORS:
Daniel V. Bailey, Pepperell, MA (US);
John G. Brainard, Sudbury, MA (US);
William M. Duane, Westford, MA (US);
Michael J. O'Malley, Lowell, MA (US);
Robert S. Philpott, Andover, MA (US)

Signed and Sealed this
First Day of January, 2013

David J. Kappos
*Director of the United States Patent and Trademark Office*

UNITED STATES PATENT AND TRADEMARK OFFICE
CERTIFICATE OF CORRECTION

PATENT NO. : 8,312,519 B1
APPLICATION NO. : 12/895130
DATED : November 13, 2012
INVENTOR(S) : Daniel V. Bailey et al.

Page 1 of 1

It is certified that error appears in the above-identified patent and that said Letters Patent is hereby corrected as shown below:

Title Page, insert Item (73):

-- (73) Assignee: EMC Corporation, Hopkinton, MA (US) --.

Signed and Sealed this
Twenty-first Day of May, 2013

Teresa Stanek Rea
*Acting Director of the United States Patent and Trademark Office*